United States Patent
Adragna

(10) Patent No.: US 10,007,014 B2
(45) Date of Patent: Jun. 26, 2018

(54) METHOD FOR DOWNLOADING DATA TO A CENTRAL UNIT IN A SEISMIC DATA ACQUISITION SYSTEM

(71) Applicant: SERCEL, Carquefou (FR)

(72) Inventor: Thierry Adragna, Nantes (FR)

(73) Assignee: SERCEL, Carquefou (FR)

( * ) Notice: Subject to any disclaimer, the term of this patent is extended or adjusted under 35 U.S.C. 154(b) by 531 days.

(21) Appl. No.: 14/578,369

(22) Filed: Dec. 20, 2014

(65) Prior Publication Data
US 2015/0177399 A1    Jun. 25, 2015

(30) Foreign Application Priority Data
Dec. 20, 2013  (EP) .................................... 13306800

(51) Int. Cl.
*H04L 29/08* (2006.01)
*G01V 1/22* (2006.01)

(52) U.S. Cl.
CPC ............... *G01V 1/22* (2013.01); *H04L 67/02* (2013.01)

(58) Field of Classification Search
CPC ................................... G01V 1/22; H04L 67/02
See application file for complete search history.

(56) References Cited

U.S. PATENT DOCUMENTS

| | | | | |
|---|---|---|---|---|
| 5,822,273 A * | 10/1998 | Bary | ...................... | G01V 1/223 340/870.11 |
| 6,735,630 B1 * | 5/2004 | Gelvin | ................ | B60R 25/1004 706/33 |
| 8,547,796 B2 * | 10/2013 | Wilcox | ................... | G01V 1/223 367/77 |
| 2002/0193947 A1 * | 12/2002 | Chamberlain | ........... | G01V 1/22 702/16 |
| 2003/0128627 A1 * | 7/2003 | Iseli | ......................... | G01V 1/22 367/60 |
| 2008/0186806 A1 * | 8/2008 | Elder | ..................... | G01V 1/247 367/79 |

(Continued)

FOREIGN PATENT DOCUMENTS

| | | |
|---|---|---|
| EP | 2189817 A1 | 5/2010 |
| EP | 2657725 A1 | 10/2013 |
| WO | 03023448 A2 | 3/2003 |

OTHER PUBLICATIONS

European Search Report and Written Opinion dated May 9, 2014 for corresponding European Patent Application No. 13306800, filed Dec. 20, 2013.

*Primary Examiner* — Philip J Chea
*Assistant Examiner* — Wuji Chen
(74) *Attorney, Agent, or Firm* — IPSILON USA, LLP

(57) ABSTRACT

It is proposed a method for downloading data to a central unit in a seismic data acquisition system including a network, connected to the central unit and having a plurality of modules. Each module is adapted to generate and/or receive data and to store them. The method includes the following steps, for a given module: when the given module is connected, via a wired or wireless link, to the central unit, it sends to the central unit a historic, chronological or not, representative of data stored in the given module; the central unit cross-checks the historic with missing data of at least one pending experience, and upon match the central unit obtains at least some of the missing data from the given module.

16 Claims, 11 Drawing Sheets

(56) References Cited

U.S. PATENT DOCUMENTS

| | | | | |
|---|---|---|---|---|
| 2008/0189044 A1* | 8/2008 | Chamberlain | ........... | G01V 1/26 |
| | | | | 702/14 |
| 2009/0168602 A1* | 7/2009 | Wilcox | ................. | G01V 1/223 |
| | | | | 367/76 |
| 2010/0128564 A1 | 5/2010 | Boucard | | |
| 2012/0106296 A1 | 5/2012 | Boucard | | |
| 2013/0286776 A1* | 10/2013 | Renaud | ................. | G01V 1/223 |
| | | | | 367/23 |
| 2014/0369166 A1* | 12/2014 | McDavid | ................. | G01V 1/36 |
| | | | | 367/43 |

* cited by examiner

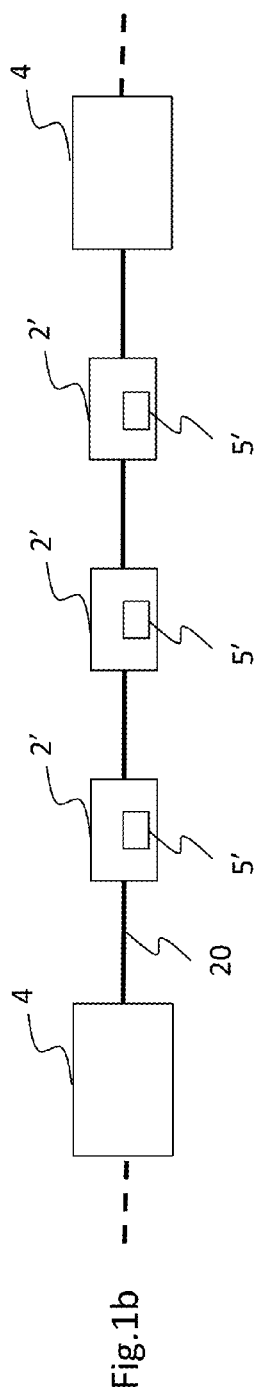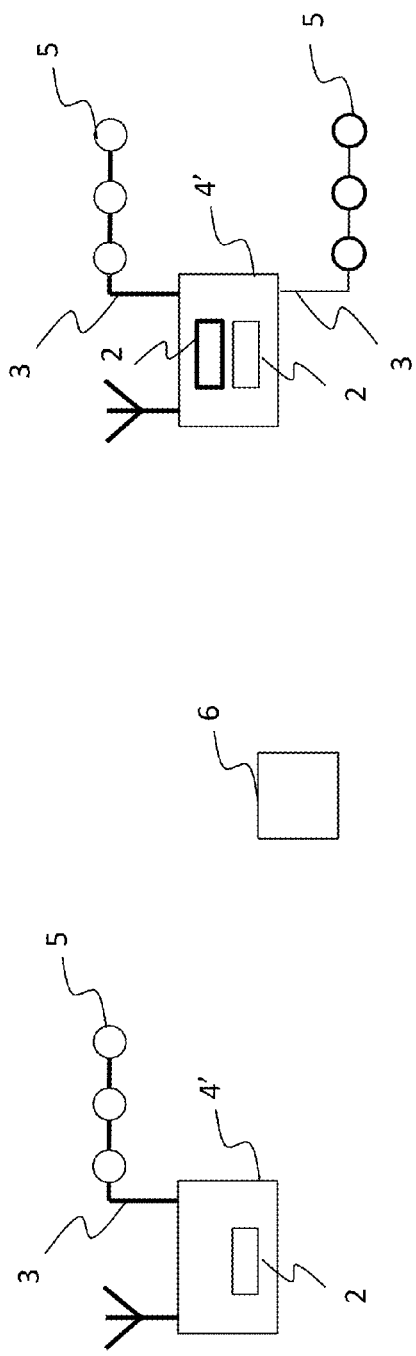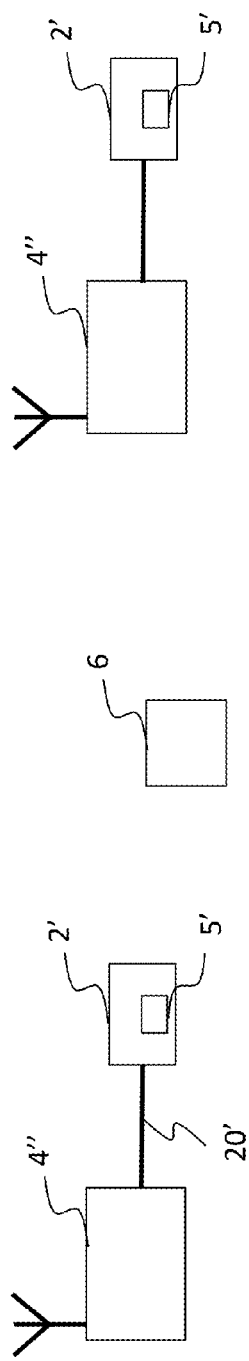

METHOD FOR DOWNLOADING DATA TO A CENTRAL UNIT IN A SEISMIC DATA ACQUISITION SYSTEM

1. FIELD OF THE INVENTION

The field of the invention is that of seismic data acquisition systems. To collect geophysical data, the principle of operation of these systems is as follows: for a given experience, one or several seismic sources (explosives, falling weights, vibrators, air guns, etc.) are activated to propagate omnidirectional seismic wave trains; the wave trains reflected by the layers of the subsurface are detected by seismic sensors, which generate a signal characterizing the reflection of the waves on the geological interfaces of the subsurface.

"Experience" refers to a seismic data acquisition operation. It begins with a seismic excitation with at least one source. It ends when all samples from all traces are recovered (retrieved), processed and released (typically under SEGD format). In the following description, "pending experience" refers to a seismic data acquisition operation which is not yet ended, e.g. because there are data not yet recovered (referred to as "missing data").

More specifically, the invention relates to a method for downloading data to a central unit (for example on-board a vehicle) in a seismic data acquisition system. The data can be seismic data (i.e. data obtained from the analog or digital seismic sensors) and/or information data (e.g. quality control (QC) data, state-of-health (SOH) data), etc).

The invention can be applied notably to the oil prospecting industry using seismic method, but can be of interest for any other field implementing a seismic data acquisition network.

One particular application of the invention relates to land seismic data acquisition systems.

2. TECHNOLOGICAL BACKGROUND

2.1 Example of Seismic Data Acquisition System

FIG. 1a shows an example of seismic data acquisition system comprising a wired network, connected to a central unit 1 and comprising a plurality of acquisition lines 10. Each acquisition line 10 comprises:

electronic units 2 (also referred to as "nodes") assembled in series along a telemetry cable 20 and each associated with at least one seismic sensor 5 (FIG. 1 shows strings 3 of seismic sensors 5). These electronic units process signals transmitted by the seismic sensor(s) and generate data;

intermediate modules 4 (also referred to as "concentrators") assembled in series along the telemetry cable 20 and each associated with at least one of the electronic units 2. In the example of FIG. 1a, each intermediate module 4 is associated with a group (n−1, n, n+1, etc.) of three electronic units 2. Each intermediate module 4 receives the data generated by the electronic unit(s) 2 with which it is associated.

The data generated by the electronic unit(s) 2 comprise seismic data and/or information data (e.g. QC data, SOH data), etc.

In the example of FIG. 1a, each acquisition line 10 is connected to the central unit 1 through one or several main wired links 7 (interconnected by intermediate modules 4), forming a main transverse line 7. In an alternative embodiment (not shown), each acquisition line 10 is connected to the central unit 1 through a wireless link (e.g. one of the intermediate module 4 has the ability to communicate wirelessly with the central unit, directly or through one or several other wireless modules and/or through one or several intermediate network devices).

The major problem of this type of network is the sensitivity of the system to cable cuts. A cable cut causes a loss of connection with the electronic units 2 and the intermediate modules 4 situated after the cut and therefore the loss of all the seismic data corresponding to these electronic units 2. Indeed, the electronic units 2 and the intermediate modules 4 are devised to only perform signal processing functions. In other words, they progressively return the seismic data (without storing them) to the central processing unit. In other words, a cable cut results in the irremediable loss of the seismic data corresponding to the sensors of the network section isolated by the cut.

To overcome the problem of cable cuts and the effects thereof, it has been proposed to organise the acquisition network in acquisition lines 10 connected to the central processing unit 1 by the main (cabled) transverse line (links 7) but also interconnected by secondary (also cabled) transverse line (links 7') forming a kind of mesh forming alternative paths in the event of a cable cut. However, this solution does not remedy all cable cut scenarios and tends to increase network installation times and costs considerably.

An alternative known solution has been proposed in European Patent EP2189817. Each intermediate modules 4 comprises for example:

synchronization means 40, comprising a satellite global positioning system 41 (GPS) for example;

electrical power supply means 42, supplying a 12 V voltage for example; and storage means 43 of the signals processed by the electronic units 2.

With the alternative known solution of EP2189817, the data acquisition network remains operational in the event of a cable cut. Indeed, following a cable cut, the operation of the section of cable isolated from the central processing unit continues by means of:

the synchronisation performed by the isolated intermediate modules 4, which is autonomous and independent from the central processing unit;

the power supply of the electronic units 2 supplied by each of the intermediate modules 4;

local storage, on each of the intermediate modules 4, of the seismic data.

Furthermore, in a normal operating situation, the electronic units 2 are associated, by default, along the telemetry cable, with a predefined intermediate module 4, adjacent to the electronic unit (particularly with respect to data storage and synchronisation): the intermediate module (n−1) is associated with the electronic unit(s) (n−1), the intermediate module (n) is associated with the electronic unit(s) (n), the intermediate module (n+1) is associated with the electronic unit(s) (n+1), etc.

However, in the event of a cable cut, an electronic unit n may be isolated from the associated module n. The alternative known solution of EP2189817 also makes it possible to remedy this situation: the bidirectional power supply means and the bidirectional storage means of each of the intermediate modules 4 make it possible to connect the electronic unit(s) (n) (isolated from the intermediate module (n) thereof) to the intermediate module (n+1), or the intermediate module (n−1) according to the position of the cut.

The intermediate modules 4 also perform signal processing and interfacing functions, not shown in FIG. 1a, with the network (data transfer to the central unit 1, sending of commands received from the central unit 1 to the electronic units 2).

In the first implementation of an acquisition line, shown in FIG. 1a (and possibly implementing the technique of EP2189817), the sensors are analog sensors 5, referred to as "geophones", generally interconnected in groups of sensors by cables to form clusters referred to as "strings of geophones" 3. One or several of these strings (in series or in parallel) are connected to each electronic unit 2 (also referred to as "Field Digitizing Unit") and this latter performs an analog to digital conversion of the signal from the groups of geophones and send these data to the central unit.

In a second implementation of an acquisition line, shown in FIG. 1b (and possibly implementing the technique of EP2189817), the sensors are digital sensors 5' (e.g. micromachined accelerometers, also referred to as "MEMS-based digital accelerometer") integrated in the electronic units 2' (also referred to as "Digital Sensor Unit"), which eliminates the geophone strings. Each electronic unit 2' integrates one or several digital sensors 5'.

In a known wireless alternative embodiment, the system comprises wireless modules (also referred to as "Remote Acquisition Units"). Each wireless module is independent, associated with (i.e. is connected to or integrates one or several functions of) one or several electronic units (nodes) and communicates wirelessly (directly or through one or several other wireless modules and/or through one or several intermediate network devices) with the central unit and/or with a harvesting device (carried by an operator also referred to as "harvester") if a data harvesting strategy is implemented. The set of wireless modules could constitute a multi-hop wireless mesh network, allowing the wireless modules to exchange data, between them and with the central unit. Thus, each wireless module stores its own data (i.e. data obtained from the electronic unit(s) with which it is associated) and, eventually, also stores data received from one or several other wireless modules (i.e. data obtained from the electronic unit(s) associated with this or these other wireless modules).

In a first implementation of this known wireless alternative embodiment, shown in FIG. 1c, the sensors are analog sensors 5 and each wireless module 4' integrates one or a plurality of electronic unit(s) 2 identical to that of FIG. 1a (or integrates at least one of its functions, notably the digitizing function). The harvesting device is referenced 6.

In a second implementation of this known wireless alternative embodiment, shown in FIG. 1d, the sensors are digital sensors 5' and each wireless module 4" is connected, through a wired link 20' to an electronic unit 2' identical to that of FIG. 1b (i.e. which integrates one or several digital sensors 5'). The harvesting device is referenced 6.

2.2 Technical Problem

As detailed above, a standard seismic data acquisition system comprises nodes (electronic units) and concentrators (intermediate modules or wireless modules). When some intelligence is integrated in the nodes and the concentrators, each node sends its data to a concentrator and this one keeps it in its memory. The central unit can retrieve the data related to this node by asking the concentrator.

The problem is that, in some cases, the central unit is not aware of the location of all data and doesn't know which concentrator to ask for some of these data.

In the context of FIGS. 1a and 1b (i.e. with intermediate modules 4), the aforesaid problem (lack of knowledge of some data location) starts when a node is located between two concentrators. Which concentrator is used to collect the data of this node? The left one or the right one? And what happens when a cut happens in the line during production? Some mechanisms exist to elect one of the potential concentrators, but they are not sufficient to allow the central unit to be aware of the data location, therefore in some cases the central unit won't know which concentrator to ask for retrieving some data.

FIGS. 2a to 2h illustrate a series of examples explaining how it may be difficult sometimes to know exactly where, i.e. in which concentrator(s), the data of a node is located. We assume that the central unit CU is in the recorder and we want to determine where are stored the node N1 data (also referred to as "N1 data").

In FIG. 2a (node connected), nodes N1 and N2 and concentrators C1 and C2 are assembled in series along a telemetry cable. C1 is connected via a wired link to the central unit. N1 data is in C1.

In FIG. 2b (disconnection), a disconnection appears between C1 and N1. N1 new data are stored in C2. There are still N1 data in C1.

In FIG. 2c (line repaired after disconnection), N1 is reconnected to C1. N1 new data are stored in C1. There are still N1 data in C2 and maybe in C1.

In FIG. 2d (concentrator change), C1 is replaced by C3. N1 new data are stored in C3. There are maybe N1 data in C2. There are maybe N1 data in C1.

In FIG. 2e (concentrator reconnected), C1 is reconnected to the line. N1 new data are stored in C3. C2 may contain N1 data. C1 may contain N1 data.

In FIG. 2f (node change), N1 and N2 are replaced by N4 and N3. C3 and C2 may still contain N1 data.

In FIG. 2g (autonomous concentrator), C1 is not connected to the central unit. N1 data is in C1, but the central unit doesn't know it.

In FIG. 2h (disconnection), a disconnection appears between C1 and N1. N1 new data are stored in C2, but the central unit doesn't know it. There are still N1 data in C1, but the central unit doesn't know it.

Also in the context of FIGS. 1a and 1b (i.e. with intermediate modules 4), the problem (lack of knowledge of some data location) exists when an acquisition line is autonomous and connected to the central unit through a wireless link.

In the context of FIGS. 1c and 1d (i.e. with wireless modules 4', 4"), the aforesaid problem (lack of knowledge of some data location) exists, and is even increased because a given wireless module can store data received from one or several other wireless modules (i.e. data obtained from electronic unit(s) not associated with this given wireless module but with other wireless modules). Therefore, the location of data becomes more difficult for the central unit.

A first solution to the aforesaid problem would consist in building in the central unit an a-priori centralized database, describing the topology of the whole system (with all nodes and all concentrators), and providing for each node an exhausted list of the concentrators to ask to find the data, by making assumptions on cuts or disconnections in the system (which produce changes of the topology). For example, if the topology indicates that node N1 is located between concentrators C1 and C2, the central unit knows (from the a-priori centralized database) that the data of node N1 is handled either by concentrator C1 or concentrator C2 (there is no other possibility). Hence the central unit may first ask concentrator C1 for the N1 data and then concentrator C2 if it was not previously found.

A main drawback of this first solution is the need for the central unit to build a complex a-priori centralized database, trying to determine in each case where the data is located (i.e. trying to have an exhaustive view of the location of all the data among the concentrators). As discussed above, in some cases the central unit may not be aware of the location of the data and won't know which concentrator ask for it.

Another drawback of this first solution is that if some data are forgotten in a concentrator, it is difficult for the central unit to retrieve them (e.g. several days later), especially if the central unit has been stop or rebooted in the meantime or if the concentrator has been laid out away and connected to other nodes.

A second solution would be to ask all concentrators for a specific data. The data flow it would generate would be important and occupy a large bandwidth in the different transmission lines.

A third solution would be to broadcast a data query on the whole system. It would appear ineffective timewise as well as the concentrator might deal with multiple queries implying processing and consuming CPU time. Also, broadcasting a query occupies a great bandwidth as the message is propagated to the whole system.

3. SUMMARY OF THE INVENTION

A particular embodiment of the invention proposes a method for downloading data to a central unit in a seismic data acquisition system comprising a network, connected to said central unit and comprising a plurality of modules, each module being adapted to generate and/or receive data and to store them. The method comprises the following steps, for a given module:
    when said given module is connected, via a wired or wireless link, to the central unit, it sends to the central unit a historic, chronological or not, representative of data stored in said given module;
    the central unit cross-checks said historic with missing data of at least one pending experience, and upon match the central unit obtains at least some of the missing data from the given module.

The idea is based on the fact that each module (concentrator) knows exactly which data it has in its memory. As a result, the central unit does not need a complex a-priori centralized database to locate the missing data. Instead, the proposed solution is based on the use of a mechanism comprising the sending of historics of data by the modules (when they are connected to the central unit) and the cross-check of these historics with the missing data, in order to enable the central unit to know where (i.e. in which modules) are stored the missing data and obtain them from the modules in question. The proposed solution allows to retrieve missing data forgotten in a module (even if it is several days later, and even if the central unit has been stop or rebooted, or if the module has been laid out away and connected to other electronic units), as soon as this module is connected to the central unit.

According to a particular feature, said data stored in said given module belong to the group comprising seismic data and information data.

In other words, the data can be seismic data (i.e. data obtained from the analog or digital seismic sensors), and/or information data (e.g. QC data, SOH data, etc.).

According to a particular feature, said data stored in said given module are generated by at least one electronic unit associated with at least one integrated or not seismic sensor.

According to a particular feature, for a given time interval, said data stored in said given module belong to the group comprising:
    data obtained from at least one electronic unit associated with said given module during said time interval; and
    data obtained from at least one electronic unit associated with another module, different from said given module, during said time interval.

According to a particular feature, said network comprises at least one acquisition line comprising a telemetry cable along which are assembled at least two modules and at least two electronic units in series, each of said at least two electronic units being connected to at least one analog seismic sensor or integrating at least one digital seismic sensor.

In other words, the proposed solution can be implemented in the context of FIGS. 1a and 1b, i.e. with modules (concentrators) which are "intermediate modules" as defined above.

According to a particular feature, said network comprises at least two modules, each acting as a wireless remote acquisition device and each:
    integrating at least a digitizing function of an electronic unit and being connected to at least one analog seismic sensor, or
    being connected to an electronic unit integrating at least one digital seismic sensor.

In other words, the proposed solution can be implemented in the context of FIGS. 1c and 1d, i.e. with modules (concentrators) which are "wireless modules" as defined above.

According to a first implementation, the historic sent by said given module to the central unit is a complete historic comprising at least one normal set of information comprising at least: a time interval, and a list of electronic unit(s) whose data for said time interval are stored by said given module.

In other words, the historic for a given module is a temporal description, comprising one or several sets of information, each set of information being representative of data stored in said given module during a given time interval. As mentioned above, the historic can be chronological (in this case the time intervals are successive) but it can also be non-chronological (in this case the time intervals are for example provided in a random order).

According to a second implementation, when said given module is connected to the central unit, the central unit sends a time limit to said given module, and the historic sent by said given module to the central unit is a partial historic, compared with a complete historic comprising at least one normal set of information comprising at least: a time interval, and a list of electronic unit(s) whose data for said time interval are stored by said given module. Said partial historic is limited to the time between said time limit and a current time.

In the first implementation, the complete historic may need a great amount of data to be transmitted. The second implementation allows to reduce this great amount of data, by sending only a partial historic, which can be seen as the result of a temporal filtering of the complete historic.

According to a particular feature of the second implementation, said time limit belongs to the group comprising: the date of an oldest sample missing to the central unit; and the date of reception by the central unit of the previous historic sent by said given module.

According to a third implementation, the historic sent by said given module to the central unit is an augmented historic, compared with a complete historic comprising at least one normal set of information comprising at least: a time interval, and a list of electronic unit(s) whose data for said time interval are stored by said given module. Said augmented historic comprises at least one augmented set of information having an augmented time interval and/or an augmented list of electronic unit(s), said at least one augmented set of information replacing at least two normal sets of information.

The third implementation also allows to reduce the aforesaid great amount of data, by sending an augmented historic which is simpler than the complete historic and therefore comprises less data to be transmitted.

According to a particular feature of the third implementation, said at least two normal sets of information, replaced by said at least one augmented set of information, relate to at least two adjacent time intervals belonging to a group comprising:
- at least two adjacent time intervals with different lists of electronic unit(s), said different lists of electronic unit(s) resulting from a change in topology of said network; and
- at least two non-adjacent time intervals with a same list of electronic unit(s), said at least two non-adjacent time intervals corresponding to different acquisition periods, without change in topology of said network and separated by at least one non-acquisition period.

According to a particular feature, the method comprises a step of determining said missing data of said at least one pending experience, comprising:
- the central unit sends queries for data to module(s) selected as a function of stored descriptions previously sent to the central unit by the modules during previous experience(s), each stored description indicating the electronic unit(s) whose data are stored by said module at a previous connection time;
- the central unit receives responses to said queries, comprising data;
- the central unit determines the missing data as a function of the data contained in the received responses.

Thus the central unit does not need a complex a-priori centralized database, describing the topology of the whole system and providing for each electronic unit (node) an exhausted list of the modules (concentrators) to ask to find the data, by making assumptions on cuts or disconnections in the system (which produce changes of the topology). Instead, for the pending experience, the central unit:
- in a first phase, uses descriptions previously sent by the modules, this allowing to obtain most of the data of the pending experience and;
- then, in a second phase, obtains the missing data with the aforesaid mechanism comprising the sending of historics of data by the modules and the cross-check of these historics with the missing data, in order to enable the central unit to know in which modules are stored the missing data and obtain them from the modules in question.

According to a particular feature, in the step of obtaining at least some of the missing data from the given module, the central unit carries out a step belonging to the group comprising:
- the central unit sends a missing data request to said given module, and receives in response at least some of the missing data;
- the central unit gives information to an harvesting device which, when operated by a field operator, collects at least some of the missing data from said given module and provide them to the central unit.

The fact to know where the missing data are stored is optimal: in the first case, it allows the central unit to send a minimum number of queries (missing data requests), and in the second case it allows to optimize the harvester journey on the field (allowing him to focus on modules having the requested missing data).

According to a particular feature, the method comprises the following step, when said given module is connected to the central unit: said given module sends to the central unit a description indicating the electronic unit(s) of which it stores data at a current connection time, allowing the central unit to know if said given module should be queried for at least one future experience.

Thus, during a pending experience, the module sends to the central unit a description which will be used during the first phase of at least one future experience. This anticipation of the knowledge of the storage location (assumption on the future location), based on the present status, allows to get quickly a vast majority of the data.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

In another embodiment, the invention pertains to a seismic data acquisition system comprising a network, connected to a central unit and comprising a plurality of modules, each module being adapted to generate and/or receive data and to store them, characterized in that it comprises:
- in at least one given module, means for sending to the central unit a historic, chronological or not, representative of data stored in said given module, said mean for sending being activated when said given module is connected, via a wired or wireless link, to the central unit;
- in the central unit, means for cross-checking said historic with missing data of at least one pending experience, and means for obtaining at least some of the missing data from the given module, said means for obtaining being activated upon match.

Advantageously, the system comprises means for implementing the steps of the process as described above, in any of its various embodiments.

4. LIST OF FIGURES

Other features and advantages of embodiments of the invention shall appear from the following description, given by way of an indicative and non-exhaustive examples and from the appended drawings, of which:

FIG. 1a, already described with reference to the prior art, presents an example of a seismic data acquisition system, with acquisition lines comprising intermediate modules and electronic units to which are connected analog sensors;

FIG. 1b, already described with reference to the prior art, presents another example of acquisition line comprising intermediate modules and electronic units integrating digital sensors;

FIG. 1c, already described with reference to the prior art, presents another example of a seismic data acquisition system, with wireless modules to which are connected analog sensors;

FIG. 1d, already described with reference to the prior art, presents another example of a seismic data acquisition system, with wireless modules to which are connected electronic units integrating digital sensors;

FIGS. 2a to 2h, already described with reference to the prior art, illustrate a series of examples explaining how it may be difficult sometimes to know exactly where, i.e. in which intermediate module(s) (concentrator(s)), the data of an electronic unit (node) is located;

5. DETAILED DESCRIPTION

In all of the figures of the present document, identical elements and steps are designated by the same numerical reference sign.

Figure 1A:
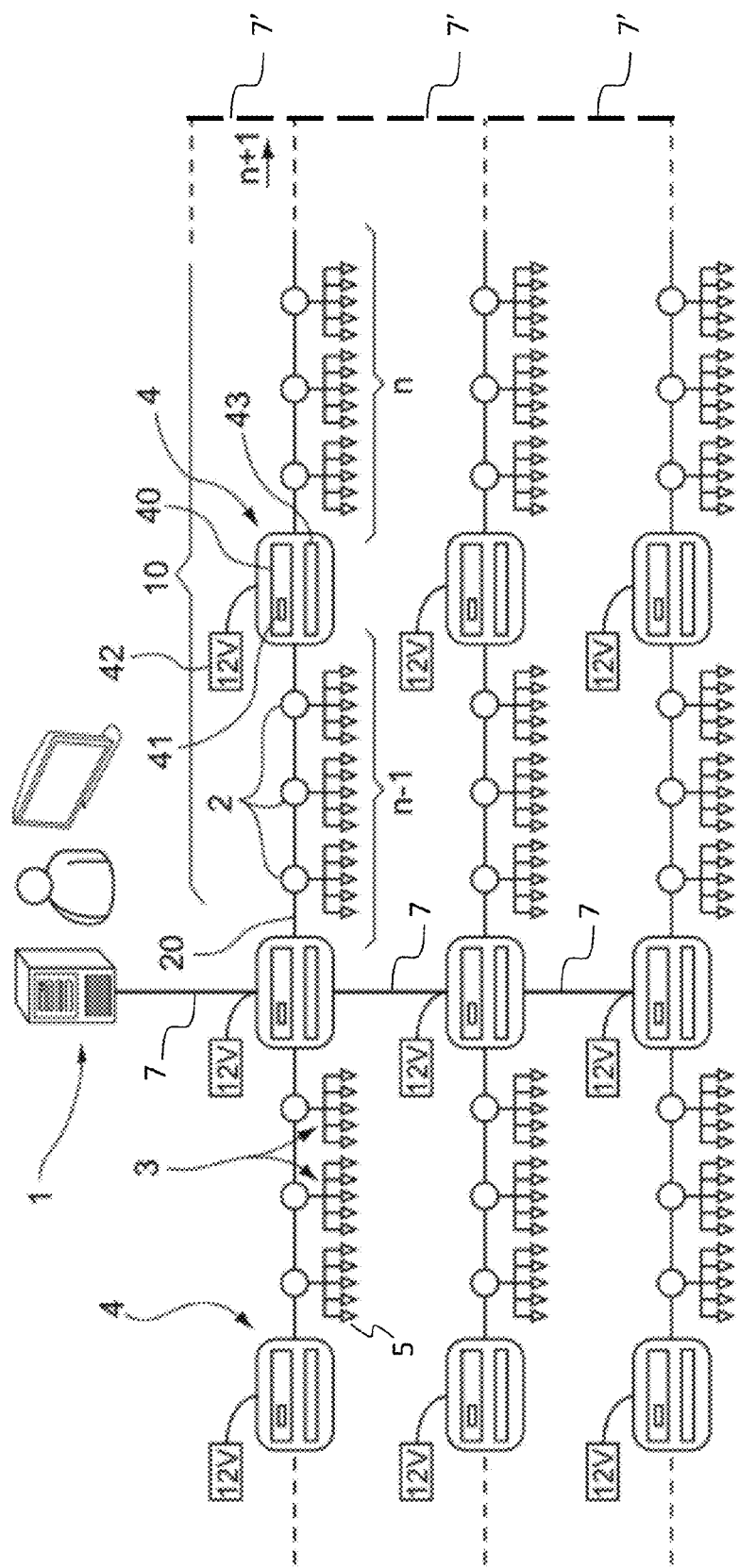
Figure 2D:
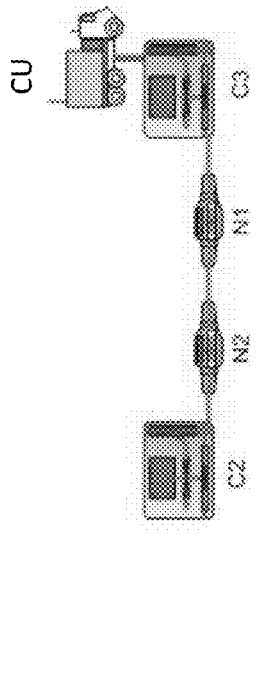
Figure 2E:
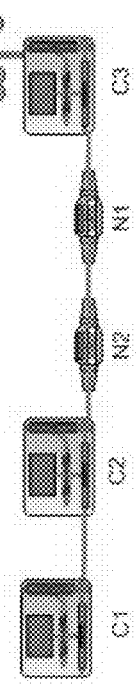
Figure 2F:
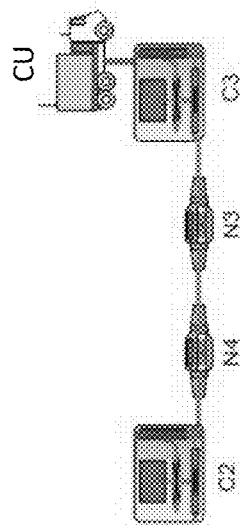
Figure 2A:
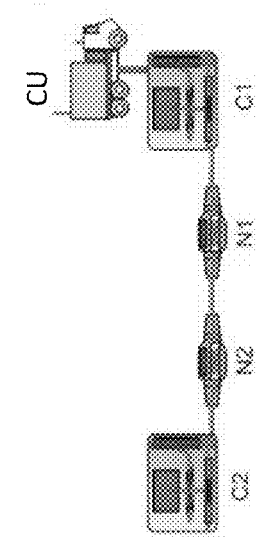
Figure 2B:
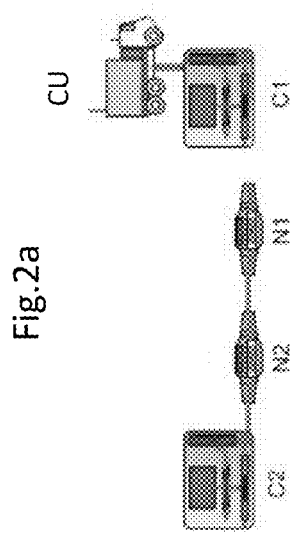
Figure 2C:
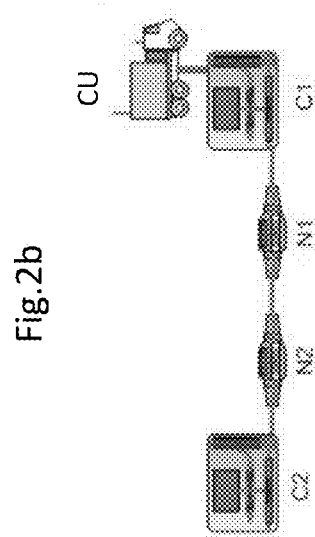
Figure 2G:
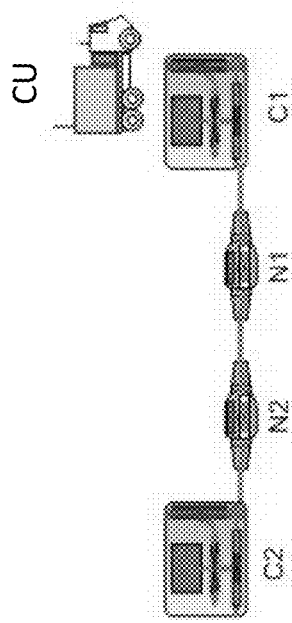
Figure 2H:
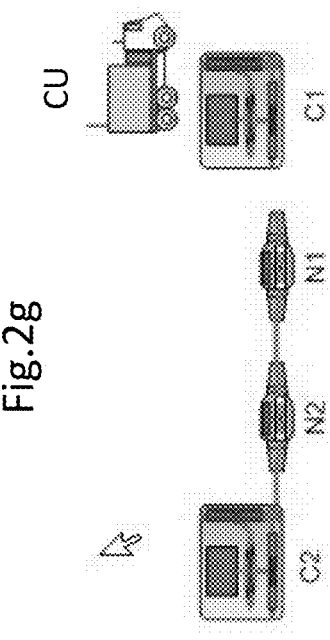

In the following description, it is considered as an example that the seismic data acquisition system has the same structure as in FIG. 1a (and possibly implementing the technique of EP2189817):

- this system comprises a central unit 1 and a plurality of acquisition lines 10;
- each acquisition line 10 comprises nodes (electronic units) 2 and concentrators (intermediate modules) 4 assembled in series along a telemetry cable 20;
- a string 3 of analog sensors (geophones) 5 is connected to each of the nodes 2 (noted N1, N2, N3 and N4 in some figures);
- each of the concentrators 4 (noted C1, C2 and C3 in some figures) is associated with a group of nodes 2 (i.e., in normal operation, receives and stores the data generated by these nodes 2).

However, it is important to note that the proposed solution applies also with any seismic data acquisition system comprising a central unit, concentrators (modules) and nodes (electronic units). In other words, the proposed solution can also be applied, notably but not exclusively, with the implementations of FIGS. 1b, 1c and 1d.

The data considered below are for example seismic data (i.e. data obtained from the seismic sensors). However, the proposed solution applies also with information data (e.g. QC data, SOH data, etc.), in addition to or instead of seismic data.

Figure 3:
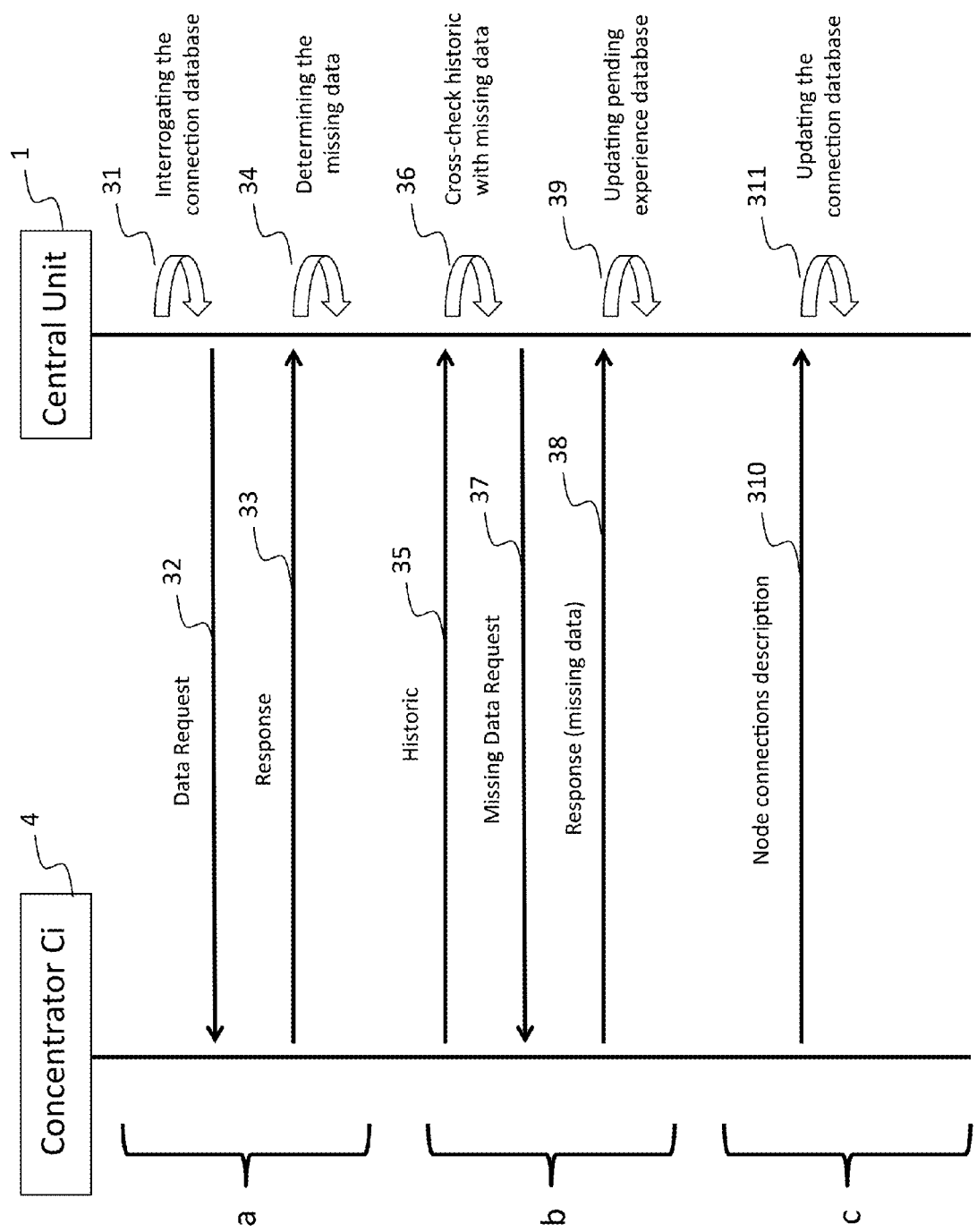
FIG. 3 is a sequence diagram illustrating a method according to a particular embodiment of the invention.

FIG. 3 is a sequence diagram illustrating a method for downloading data to the central unit 1, according to a particular embodiment of the invention. This sequence diagram implies the central unit 1 and a concentrator 4 (noted Ci to show it is a generic explanation, which applies to all concentrators).

There are three phases, noted a, b and c. It must be noted that phase b follows phase a. In FIG. 3, phase c is executed after phase a, but the reverse is also possible. Phases a and c can even be executed simultaneously.

Description of Phase a

In step 31, the central unit tries to know in which concentrators (called hereafter "selected concentrators") are stored the data of the nodes involved in a pending experience. For this purpose, it queries a connection database (or any other appropriate storing means) which stores descriptions previously sent to the central unit by all the concentrators (or certain of them) during previous experience(s). Each stored description indicates the nodes managed by the concentrator which has sent this description, at a previous connection time. At the current time, it is possible that this concentrator doesn't manage any more the same nodes, but the central unit doesn't know it. As a function of the content of the connection database, the central unit obtains a list of selected concentrators, and a list of managed nodes for each selected concentrator. Hereafter, we assume that concentrator Ci is a selected concentrator.

In step 32, the central unit sends a query (data request) for data to the concentrator Ci, specifying the nodes for which data are expected.

In step 33, the central unit receives a response from the concentrator Ci, comprising the requested data (or only some of them, if the concentrator Ci doesn't manage any more the same nodes).

In step 34, the central unit determines the missing data, i.e. the data requested to all the selected concentrators, bot not received from them.

Description of Phase b

In step 35, when it is connected (via a wired or wireless link) to the central unit, the concentrator Ci sends to it a historic of the data stored in the concentrator Ci. In a particular embodiment, the historic sent by the concentrator Ci is a complete historic comprising one or several sets of information each comprising at least a time interval and a list of node(s) associated with the concentrator Ci during said time interval, and whose data for said time interval are stored by the concentrator Ci. Each set of information can also comprise supplemental data (e.g. the GPS position of the nodes). The historic is for example chronological (i.e. the time intervals are successive) but it can also be non-chronological (the time intervals are for example provided in a random order).

In step 36, the central unit cross-checks the historic (received in step 35) with missing data (determined in step 34).

Upon match, in step 37 the central unit sends a query (missing data request) for missing data to the concentrator Ci.

In step 38, the central unit receives a response from the concentrator Ci, comprising the requested missing data (i.e. the part of the missing data stored by the concentrator Ci).

In an alternative embodiment to steps 37 and 38, the central unit obtains missing data from the concentrator Ci via a portable unit (also referred to as "harvesting device") carried by an operator (also referred to as "harvester") and linked (the link may be of any type, wired or wireless, known to those skilled in the art) with the concentrator Ci. In this case, the central unit generates a list of nodes and timestamps to collect and transfers it to the harvesting device. This list will be submitted by the harvesting device to the concentrator.

In step 39, the central unit updates, with the data obtained from the concentrator Ci, a pending experience database (or any other appropriate storing means) which stores the data received from all the concentrators for the pending experience.

Description of Phase c

In step 310, when it is connected (via a wired or wireless link) to the central unit, the concentrator Ci sends to the central unit a description of the node(s) it manages at the current connection time.

In step 311, the central unit updates, with the description received in step 310, the connection database. This allows the central unit to know if the concentrator Ci should be queried for at least one future experience.

Figure 4:
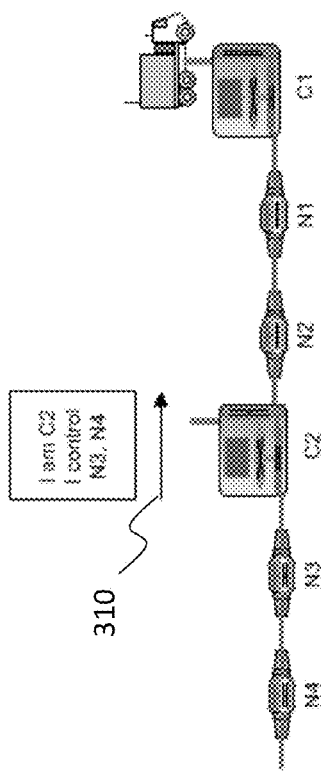
FIGS. 4 and 5 illustrate two steps (sending of a node connections description and sending of a historic) of the method of FIG. 3.

FIG. 4 illustrates the step 310 (sending of a description) of the method of FIG. 3. We assume that, in normal operation, the concentrator C1 manages the nodes N1 and N2 and the concentrator C2 manages the nodes N3 and N4. In this example, we consider that the concentrator Ci is C2. The description sent by the concentrator C2 indicates this ("I am C2") and the fact that C2 manages (i.e. controls) the nodes N3 and N4 at the current connection time.

Figure 5:
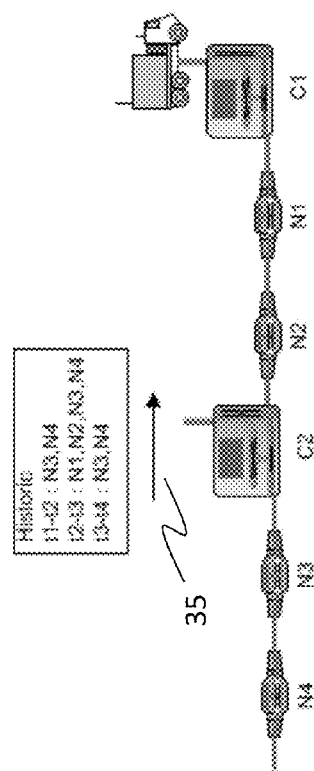

FIG. 5 illustrates the step 35 (sending of a historic) of the method of FIG. 3. We assume again that, in normal operation, the concentrator C1 manages the nodes N1 and N2 and the concentrator C2 manages the nodes N3 and N4. In this example, we consider that the concentrator Ci is C2. We assume that a line cut, between N1 and C1, occurred at t2 and was repaired at t3. Between t2 and t3, the nodes N1 and N2 are managed by the concentrator C2. The historic sent by the concentrator C2, determined at a current time t4, comprises the following sets of information (each comprising at least a time interval and a list of node(s)):

t1-t2: N3, N4
t2-t3: N1, N2, N3, N4
t3-t4: N3, N4.

Figure 6:
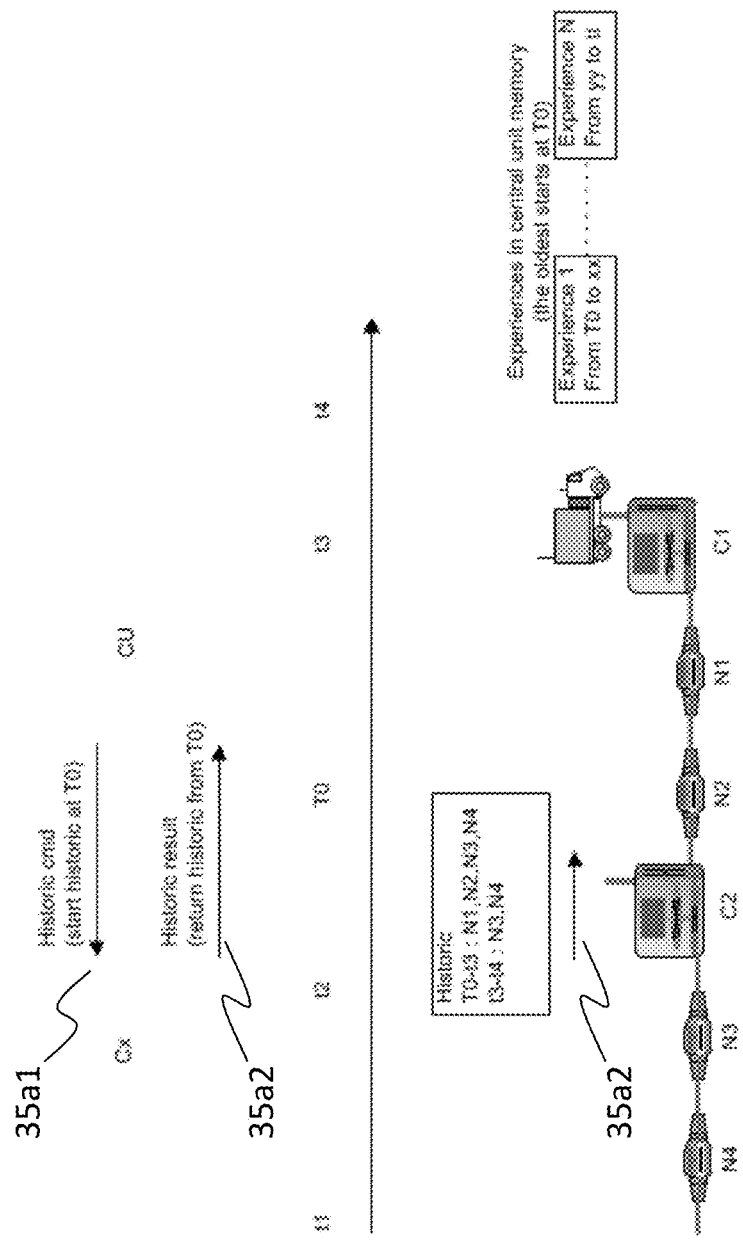
FIG. 6 illustrates a first variant.

FIG. 6 illustrates a first variant of the step 35 (sending of a historic) of the method of FIG. 3. The concentrator Ci may have in memory data acquired few days before. It's useless to send the historic of these data if the central unit doesn't need it. For this reason the historic is not automatically send by the concentrator, but only on request (step 35a1) of the central unit which provides the concentrator with a time limit which is the GPS date of its oldest missing sample. Then the concentrator can provide (step 35a2) a historic limited to the time between this time limit and the current time.

In the example of FIG. 6, we consider that the concentrator Ci is C2. We assume that a line cut, between N1 and C1, occurred at t2 and was repaired at t3. We assume that T0 is the GPS date of the oldest sample missing to the central unit. The historic, determined at a current time t4, comprises the following sets of information:

T0-t3: N1, N2, N3, N4
t3-t4: N3, N4.

Figure 7:
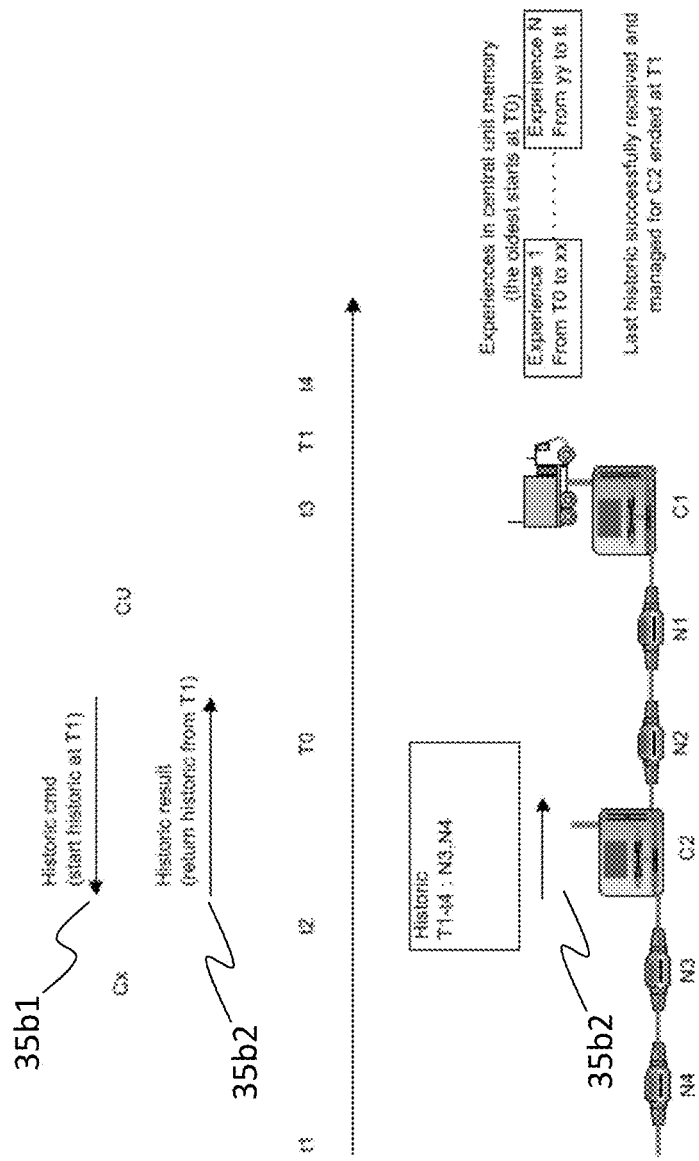
FIG. 7 illustrates a second variant.

FIG. 7 illustrates a second variant of the step 35 (sending of a historic) of the method of FIG. 3. If there are several cuts/repairs of the line, each time it comes back, the concentrator Ci will send back its historic to the central unit. It is useless, expensive in bandwidth and the central unit has to manage again the part of historic already received. The proposed solution is for the central unit to note the date of reception of the previous historic sent by the concentrator Ci (if it was managed without any error). Next time the concentrator Ci comes back, it is requested by the central unit to limit the historic to the end of its previous historic. In other words, the historic is not automatically sent by the concentrator, but only on request (step 35b1) of the central unit which provides the concentrator with a time limit which is the date of reception of the previous historic sent by the concentrator Ci. Then the concentrator can provide (step 35b2) a historic limited to the time between this time limit and the current time.

In the example of FIG. 7, we consider that the concentrator Ci is C2. We assume that a line cut, between N1 and C1, occurred at t2 and was repaired at t3. We assume that T0 is the GPS date of the oldest sample missing to the central unit. We assume that T1 is the date of reception of the previous historic sent by C2. The historic, determined at a current time t4, comprises the following set of information:

T1-t4: N3, N4.

Figure 8:
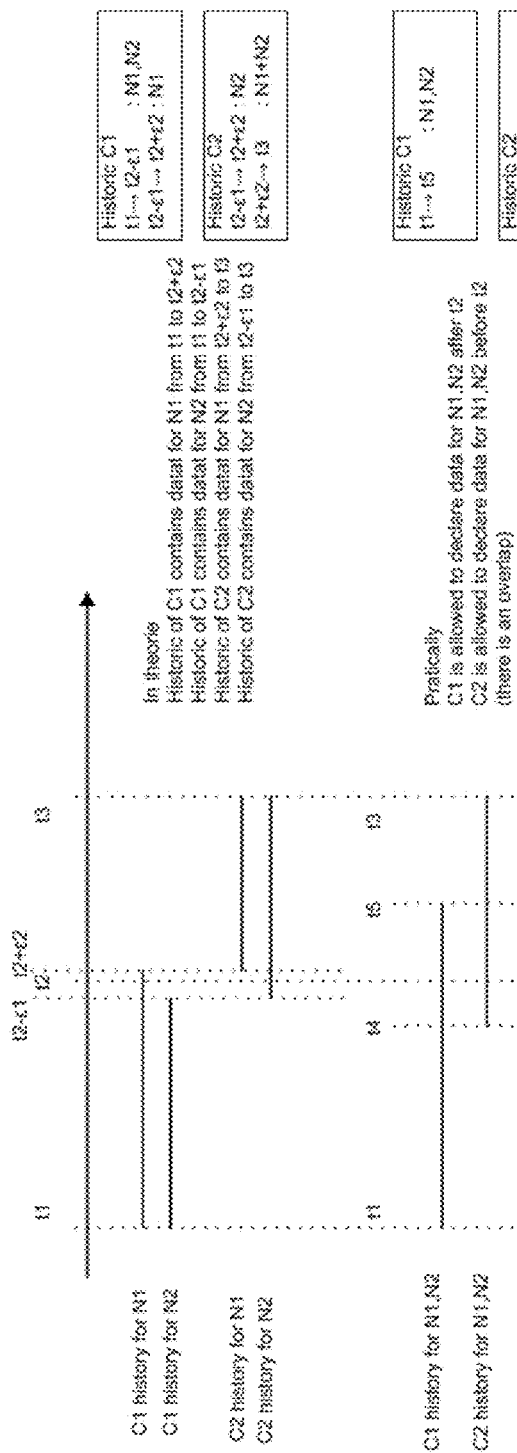
FIG. 8 illustrates a third variant.

FIG. 8 illustrates a third variant of the step 35 (sending of a historic) of the method of FIG. 3. The idea is that the historic sent by the concentrator Ci to the central unit is an augmented historic, compared with a complete historic (see FIG. 5) comprising at least one normal pair set of information comprising at least:
  a time interval, and
  a list of node(s) associated with the concentrator Ci during said time interval, and whose data for said time interval are stored by the concentrator Ci.

The augmented historic comprises one or several augmented sets of information having an augmented time interval and/or an augmented list of node(s). Each augmented set of information replaces at least two normal sets of information.

In other words, the historic sent by the concentrator doesn't need to be precise. Therefore, the concentrator sends an augmented historic complying with the following rules:
  the concentrator is allowed to say it has some data in memory even if it hasn't these data;
  but the concentrator is not allowed to say it hasn't some data if it has it.

This tolerance provides a great simplification of the historic.

In the third variant illustrated in FIG. 8, the at least two normal sets of information, replaced by a given augmented set of information, relate to at least two adjacent time intervals with different lists of node(s), these different lists of node(s) resulting from a change in topology of the network (e.g. a line cut).

The example of FIG. 8 illustrates that after a line cut, we don't need to know the exact GPS date (precise at the sample rate) of the cut. In this example, we consider the concentrator C1 and C2. We assume that a line cut, between N1 and C1, occurred (let say at t2), but in fact the cut doesn't occur at the same time for each node (let say t2-ε1 for N2 an t2+ε2 for N1). The consequence leads to very long historics when you have a great number of nodes (i.e. more than only N1 and N2 in the simplified above example).

The theoretical historic of C1 would comprise the following sets of information:
  t1 to t2-ε1: N1, N2
  t2-ε1 to t2+ε2: N1.

The theoretical historic of C2 would comprise the following sets of information:
  t2-ε1 to t2+ε2: N2
  t2+ε2 to t3: N1, N2.

The proposed solution simplifies the historic, by generating an augmented historic. C1 is allowed to declare data for N1 and N2 after t2. C2 is allowed to declare data for N1 and N2 before t2. There is an overlap.

Practically, the augmented historic of C1 comprises the following set of information:
  t1 to t5: N1, N2.

The augmented historic of C2 (sent at step 35c) comprises the following set of information:

t4 to t3: N1, N2.

It must be noted that in FIG. 8, t3 is not the time at which the line was repaired.

Figure 9:
FIG. 9 illustrates a fourth variant.

FIG. 9 illustrates a fourth variant of the step 35 (sending of a historic) of the method of FIG. 3.

As in the third variant of FIG. 8, the idea is that the historic sent by the concentrator Ci to the central unit is an augmented historic, with a tolerance providing a great simplification compared with the complete (theoretical) historic.

In the fourth variant illustrated in FIG. 9, the at least two normal sets of information, replaced by a given augmented set of information, relate to at least two non-adjacent time intervals with a same list of electronic unit(s), said at least two non-adjacent time intervals corresponding to different acquisition periods, without change in topology of the network and separated by at least one non-acquisition period. In other words, only a change in the topology leads to a change in the augmented historic.

In the example of FIG. 9, we assume there are:
- a succession of periods of different types (t041: test; t1-t2: acquisition; t2-t3: test; t3-t4: off; t4-t5: acquisition; t5-t6: test; t6-t8: acquisition; t8-t9: low power; t9-t10: test; . . . ); and
- a line cut between N1 and C1 at t7 (i.e. during the acquisition period t6-t8).

The theoretical historic of C2 would comprise the following sets of information:

t1-t2: N3, N4
t4-t5: N3, N4
t6-t7: N3, N4
t7-t8: N1, N2, N3, N4.

Practically, the augmented historic of C2 (sent at step 35d) comprises the following sets of information:

t0-t7: N3, N4
t7-t10: N1, N2, N3, N4.

Figure 10:
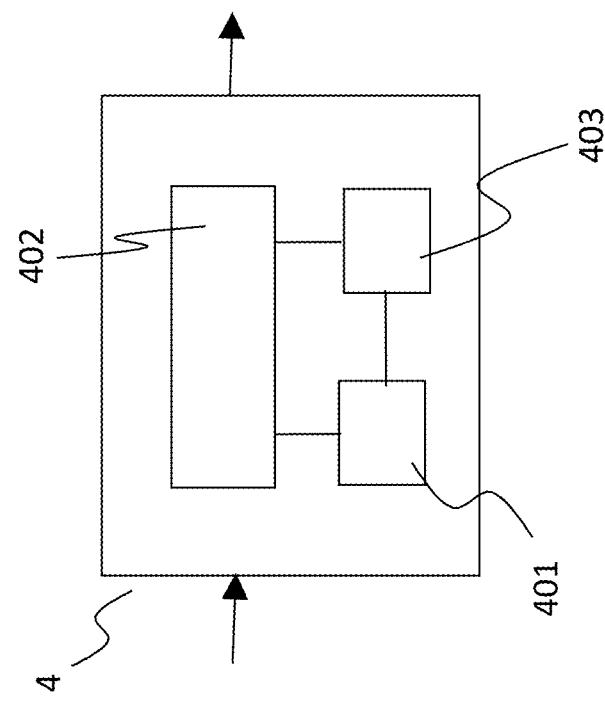
FIG. 10 shows the simplified structure of an intermediate module (concentrator) according to a particular embodiment of the invention.

FIG. 10 presents the simplified structure of an intermediate module (concentrator) 4 according to a particular embodiment of the invention. It comprises a non-volatile memory 403 (e.g. a read-only memory (ROM)), a volatile memory 401 (e.g. a random access memory (RAM)) and a processor 402. The non-volatile memory 403 (non-transitory computer-readable carrier medium) stores executable program code instructions, which are executed by the processor 402 in order to enable implementation, by the concentrator 4, of the method described above (see FIGS. 3-9). Upon initialization, the aforementioned program code instructions are transferred from the non-volatile memory 403 to the volatile memory 401 so as to be executed by the processor 402. The volatile memory 401 likewise includes registers for storing the variables and parameters required for this execution.

Figure 11:
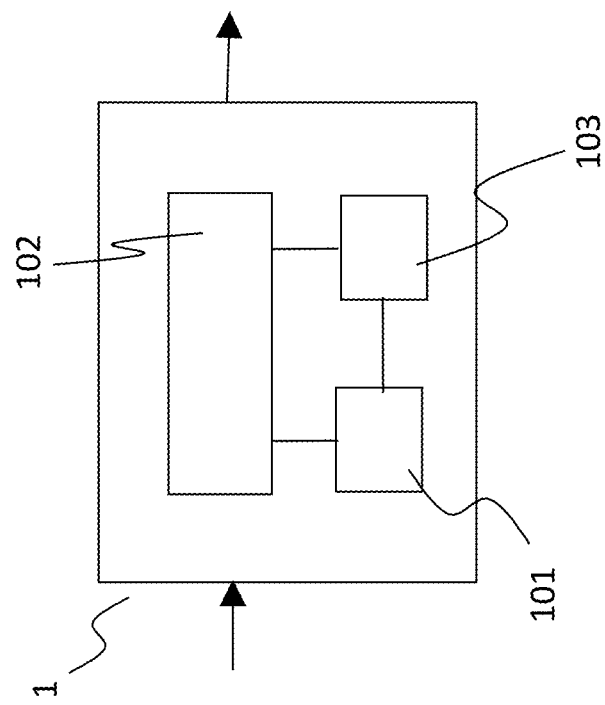
FIG. 11 shows the simplified structure of a central unit according to a particular embodiment of the invention.

FIG. 11 presents the simplified structure of the central unit 1 according to a particular embodiment of the invention. It comprises a non-volatile memory 103 (e.g. a hard disk), a volatile memory 401 (e.g. a random access memory (RAM)) and a processor 102. The non-volatile memory 103 (non-transitory computer-readable carrier medium) stores executable program code instructions, which are executed by the processor 102 in order to enable implementation, by the central unit 1, of the method described above (see FIGS. 3-9). Upon initialization, the aforementioned program code instructions are transferred from the non-volatile memory 103 to the volatile memory 101 so as to be executed by the processor 102. The volatile memory 101 likewise includes registers for storing the variables and parameters required for this execution.

For each concentrator 4 and the central unit 1, all the steps of the proposed method can be implemented equally well:
- by the execution of a set of program code instructions executed by a reprogrammable computing machine such as a PC type apparatus, a DSP (digital signal processor) or a microcontroller, as shown in FIGS. 10 and 11. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

At least one embodiment of the disclosure provides a technique for downloading data to a central unit in a seismic data acquisition system, with no need for the central unit to have an exhaustive view of the location of all the data among the concentrators (intermediate modules or wireless modules).

At least one embodiment provides a technique for finding in which concentrator(s) the data is located, without the need of the aforesaid complex a-priori centralized database of the standard solution.

At least one embodiment provides a technique of this kind which allows to retrieve the data even if the concentrator has been moved or used with other nodes (electronic units), and even if the central unit has been stop or rebooted or if the concentrator has been laid out away and connected to other nodes.

At least one embodiment provides a technique of this kind, enabling to reduce the amount of data to be transmitted between the concentrators and the central unit.

At least one embodiment optimizes the data throughput in the system.

At least one embodiment optimizes the processing time in the concentrators.

At least one embodiment, in the case of a harvesting of the data, optimizes the field harvesting operator journey, allowing him to focus on concentrators having the requested data.

Although the present disclosure has been described with reference to one or more examples, workers skilled in the art will recognize that changes may be made in form and detail without departing from the scope of the disclosure and/or the appended claims.

The invention claimed is:

1. A method for downloading data to a central unit in a seismic data acquisition system
   comprising a network, connected to said central unit and comprising a plurality of modules, each module being adapted to generate and/or receive data and to store them,
   wherein said method comprises the following steps, for a given module:
   a first step wherein when said given module is connected, via a wired or wireless link, to the central unit, said given module sends to the central unit a historic, chronological or not,
   said historic being a temporal description, comprising one or several sets of information, each set of information being representative of data stored in said given module during a given time interval, but without said given module transmitting said stored data during this first step;

a second step wherein the central unit cross-checks said historic of data stored in said given module with information representative of missing data of at least one pending experience, and a third step wherein, upon match of said historic and information representative of missing data, the central unit: identifies, on the basis that said matching historic has been received from said given module, that said given module stores missing data corresponding to said match;

sends a query for missing data to the identified given module, receives a response from said identified given module, comprising the requested missing data.

2. The method according to claim 1, wherein said data stored in said given module belong to the group consisting of seismic data and information data.

3. The method according to claim 1, wherein said data stored in said given module are generated by at least one electronic unit associated with at least one integrated or not seismic sensor.

4. The method according to claim 1, wherein, for a given time interval, said data stored in said given module belong to the group consisting of: data obtained from at least one electronic unit associated with said given module during said time interval; and data obtained from at least one electronic unit associated with another module, different from said given module, during said time interval.

5. The method according to claim 3, wherein said network comprises at least one acquisition line comprising a telemetry cable along which are assembled at least two modules and at least two electronic units in series, each of said at least two electronic units being connected to at least one analog seismic sensor or integrating at least one digital seismic sensor.

6. The method according to claim 3, wherein said network comprises at least two modules, each acting as a wireless remote acquisition device and each: integrating at least a digitizing function of an electronic unit and being connected to at least one analog seismic sensor, or being connected to an electronic unit integrating at least one digital seismic sensor.

7. The method according to claim 3, wherein the historic sent by said given module to the central unit is a complete historic comprising at least one normal set of information comprising at least: a time interval, and a list of electronic units) whose data for said time interval are stored by said given module.

8. The method according to claim 3, wherein, when said given module is connected to the central unit, the central unit sends a time limit to said given module, and wherein the historic sent by said given module to the central unit is a partial historic, compared with a complete historic comprising at least one normal set of information comprising at least: a time interval, and a list of electronic unit(s) whose data for said time interval are stored by said given module; said partial historic being limited to the time between said time limit and a current time.

9. The method according to claim 8, wherein said time limit belongs to the group consisting of: the date of an oldest sample missing to the central unit; and the date of reception by the central unit of the previous historic sent by said given module.

10. The method according to claim 3, wherein the historic sent by said given module to the central unit is an augmented historic, compared with a complete historic comprising at least one normal set of information comprising at least: a time interval, and a list of electronic unit(s) whose data for said time interval are stored by said given module; said augmented historic comprising at least one augmented set of information having an augmented time interval and/or an augmented list of electronic unit(s), said at least one augmented set of information replacing at least two normal sets of information.

11. The method according to claim 10, wherein said at least two normal sets of information, replaced by said at least one augmented set of information, relate to at least two adjacent time intervals belonging to a group consisting of: at least two adjacent time intervals with different lists of electronic unit(s), said different lists of electronic unit(s) resulting from a change in topology of said network; and at least two non-adjacent time intervals with a same list of electronic unit(s), said at least two non-adjacent time intervals corresponding to different acquisition periods, without change in topology of said network and separated by at least one non-acquisition period.

12. The method according to claim 3, comprising a step of determining said missing data of said at least one pending experience, comprising: the central unit sends queries for data to module(s) selected as a function of stored descriptions previously sent to the central unit by the modules during previous experience(s), each stored description indicating the electronic unit(s) whose data are stored by said module at a previous connection time; the central unit receives responses to said queries, comprising data; the central unit determines the missing data as a function of the data contained in the received responses.

13. The method according to claim 1, wherein, in the step of obtaining at least some of the missing data from the given module, the central unit carries out a step belonging to the group consisting of: the central unit sends a missing data request to said given module, and receives in response at least some of the missing data; the central unit gives information to an harvesting device which, when operated by a field operator, collects at least some of the missing data from said given module and provide them to the central unit.

14. The method according to claim 3, comprising the following step, when said given module is connected to the central unit: said given module sends to the central unit a description indicating the electronic unit(s) of which it stores data at a current connection time, allowing the central unit to know if said given module should be queried for at least one future experience.

15. A non-transitory computer-readable carrier medium storing a program which, when executed by a computer or a processor, causes the computer or the processor to carry out a method for downloading data to a central unit in a seismic data acquisition system comprising a network, connected to said central unit and comprising a plurality of modules, each module being adapted to generate and/or receive data and to store them, wherein said method comprises the following steps, for a given module:

a first step wherein when said given module is connected, via a wired or wireless link, to the central unit, said given module sends to the central unit a historic, chronological or not, said historic being a temporal description, comprising one or several sets of information, each set of information being representative of data stored in said given module during a given time interval, but without said given module transmitting said stored data during this first step;

a second step wherein the central unit cross-checks said historic of data stored in said given module with information representative of missing data of at least one pending experience, and a third step wherein, upon match said historic and information representative of missing data, the central unit:

identifies, on the basis that said matching historic has been received from said given module, that said given module stores missing data corresponding to said match;

sends a query for missing data to the identified given module, receives a response from said identified given module, comprising the requested missing data.

16. A seismic data acquisition system
comprising a network, connected to a central unit and
comprising a plurality of modules, each module being adapted to generate and/or receive data and to store them,
wherein said seismic data acquisition system comprises:
in at least one given module,
means for sending to the central unit a historic, chronological or not, said historic being a temporal description, comprising one or several sets of information, each set of information being representative of data stored in said given module during a given time interval, but without said given module transmitting said stored data, said means for sending being activated when said given module is connected, via a wired or wireless link, to the central unit;

in the central unit, means for cross-checking said historic of data stored in said given module with information representative of missing data of at least one pending experience, and upon match of said historic and information representative of missing data, the central unit:

identifies, on the basis that said matching historic has been received from said given module, that said given module stores missing data corresponding to said match;

sends a query for missing data to the identified given module, receives a response from said identified given module, comprising the requested missing data.

\* \* \* \* \*